United States Patent
Huang

(10) Patent No.: US 6,688,204 B2
(45) Date of Patent: Feb. 10, 2004

(54) CUTTING MACHINE OF DUAL BLADE FEEDING FOR BLIND OF FOAMED PLASTICS

(76) Inventor: Shien-Te Huang, P.O. Box No. 6-57, Chung-Ho City, Taipei Hsien 235 (TW)

( * ) Notice: Subject to any disclaimer, the term of this patent is extended or adjusted under 35 U.S.C. 154(b) by 226 days.

(21) Appl. No.: 09/791,596

(22) Filed: Feb. 26, 2001

(65) Prior Publication Data

US 2002/0117039 A1 Aug. 29, 2002

(51) Int. Cl.$^7$ .......................... B23D 23/00; B26D 5/08; B26D 7/02
(52) U.S. Cl. .................. 83/622; 83/631; 83/454; 83/465; 83/620; 29/24.5
(58) Field of Search .................. 83/618, 619, 620, 83/622, 623, 631, 197, 198, 455, 454, 465, 582, 583, 629; 29/24.5

(56) References Cited

U.S. PATENT DOCUMENTS

| | | | | |
|---|---|---|---|---|
| 4,627,321 A | * | 12/1986 | Moore | 83/468 |
| 4,819,530 A | * | 4/1989 | Huang | 29/24.5 |
| 5,339,716 A | * | 8/1994 | Sands et al. | 29/24.5 |
| 5,816,126 A | * | 10/1998 | Pluber | 29/24.5 |
| 5,927,172 A | * | 7/1999 | Wang | 83/454 |
| 6,079,306 A | * | 6/2000 | Liu | 83/167 |
| 6,167,789 B1 | * | 1/2001 | Daniels et al. | 29/24.5 |
| 6,178,857 B1 | * | 1/2001 | Marocco | 29/24.5 |
| 6,240,824 B1 | * | 6/2001 | Hsu | 29/24.5 |
| 6,314,851 B1 | * | 11/2001 | Graves et al. | 29/24.5 |
| 6,334,379 B1 | * | 1/2002 | Sudano | 29/24.5 |
| 6,336,388 B1 | * | 1/2002 | Marocco | 29/24.5 |

\* cited by examiner

Primary Examiner—Boyer D. Ashley
(74) Attorney, Agent, or Firm—Troxell Law Office PLLC

(57) ABSTRACT

A cutting machine of dual blade feeding for a blind of foamed plastics, more specially a cutting machine providing the cutting application for the blind of foamed plastics that includes a filing board with a squeezing blade and a trimming blade mounted relative to the cutting end. The squeezing blade and the trimming blade respond to a shiftable tool block. During the cutting process, when the squeezing blade and the trimming blades move respectively, the shifting corresponding to the shifting status of the tool block can be used to provide the two cutting tools with the resistant force of press cutting to align to the angular position to produce an evenly cut end of the foamed plastics.

5 Claims, 7 Drawing Sheets

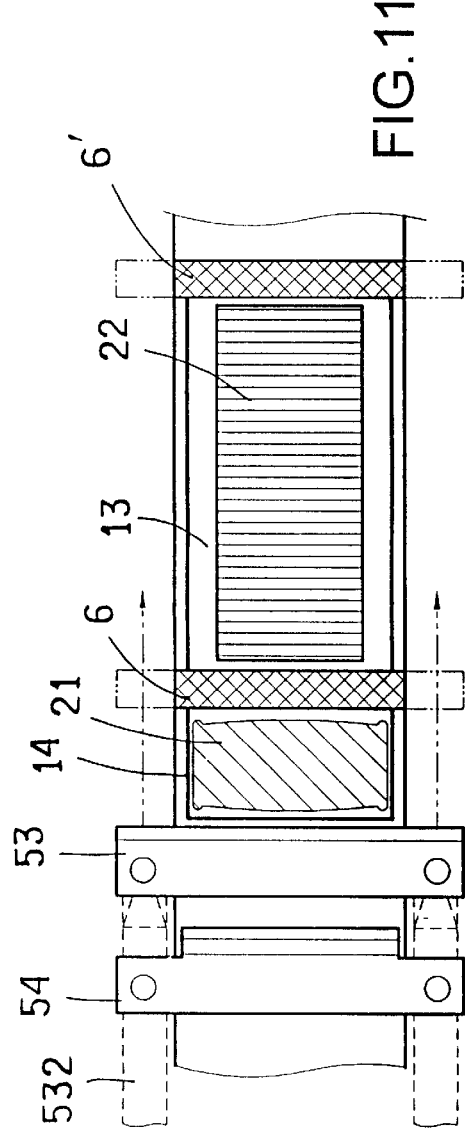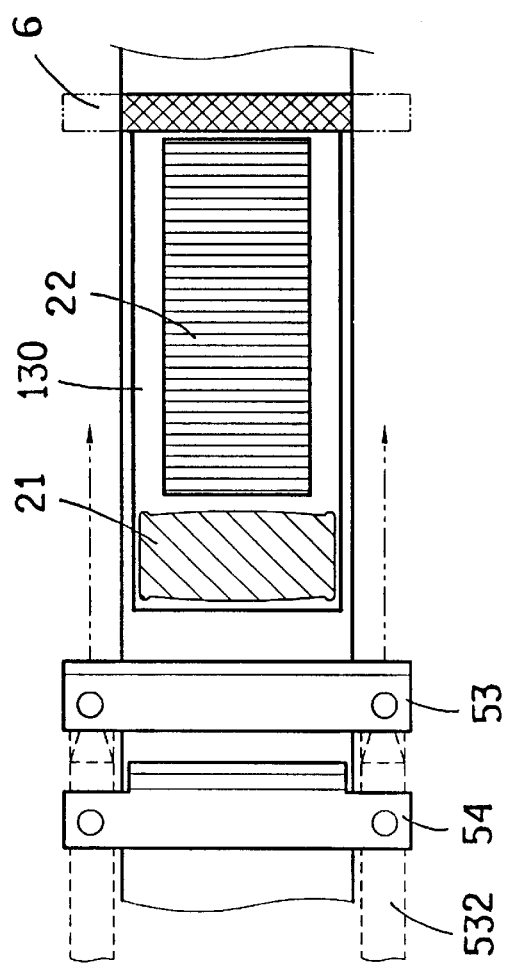

CUTTING MACHINE OF DUAL BLADE FEEDING FOR BLIND OF FOAMED PLASTICS

BACKGROUND OF THE INVENTION

1. Field of the Invention

An improved cutting machine of dual blade feeding for a blind of foamed plastics, more specifically an improved cutting machine providing the cutting application for the blind of foamed plastics having a filing board with a squeezing blade and a trimming blade mounted relative to the cutting end. The squeezing blade and the trimming blade respond to a shiftable tool block; during the cutting process, when the squeezing blade and the trimming blades move respectively, the shifting corresponding to the shifting status of the tool block can be used to efficiently provide the two cutting tools with the resistant force of press cutting to align to the angular position to achieve the efficiency of obtaining an evenly cut end of the foamed plastics.

2. Description of the Prior Art

The materials for the rods of the common blind, such as the upper rail, the strips and the lower rail of the blind has been substituted by the foamed plastics squeezed in manufacturing due to the improvement of the present industrial plastics. Furthermore, in actual application, the blind has to be cut to get the proper size to fit the widths of the windows in various sizes in every room. Since the popular wholesale stores sell the DIY blinds with many kinds of sizes to fit the various windows, they have a lot of pressure in terms of stocking. The length of the blind has to be customized to fit various kinds of windows, therefore, the cutting operation is necessary.

All of the available cutting machines are for the professional usage, only the masters know how to operate safely and the specific equipment of peripheral machines or tools are required to work together to achieve the efficient cutting. Furthermore, usually the foamed plastics can only be cut off by squeezing, therefore the cut side often appears rough or is even left with sharp fuzzy edges to injure the user's skin.

SUMMARY OF THE INVENTION

Therefore, the invention herein especially uses the dual blade feeding to cut the foamed plastics to obtain an even cut end surface for sure and employs manually cranking wheel to engage the feeding movement of the threaded rod to provide the convenience of application as the main objective.

Another objective of the invention herein is to synchronously cut the strips of the blind in one time through the feeding of dual cutting.

Yet another objective of the invention herein is to use the externally attaching method to install every blade for protecting and replacing the blade.

Still another objective of the invention herein is to have the filing board retained to the retaining ends of the retaining blocks to make the assembly for the entire machine with tools become very simple and easy for manufacturing.

To enable a further understanding of the objectives and the technological methods of the invention herein, the brief description of the drawings below is followed by the detailed description of the preferred embodiments.

BRIEF DESCRIPTION OF THE DRAWINGS

FIG. 11 is the first drawing of another preferred embodiment of the invention herein.

FIG. 12 is the second drawing of another preferred embodiment of the invention herein.

DETAILED DESCRIPTION OF THE PREFERRED EMBODIMENTS

Figure 1:
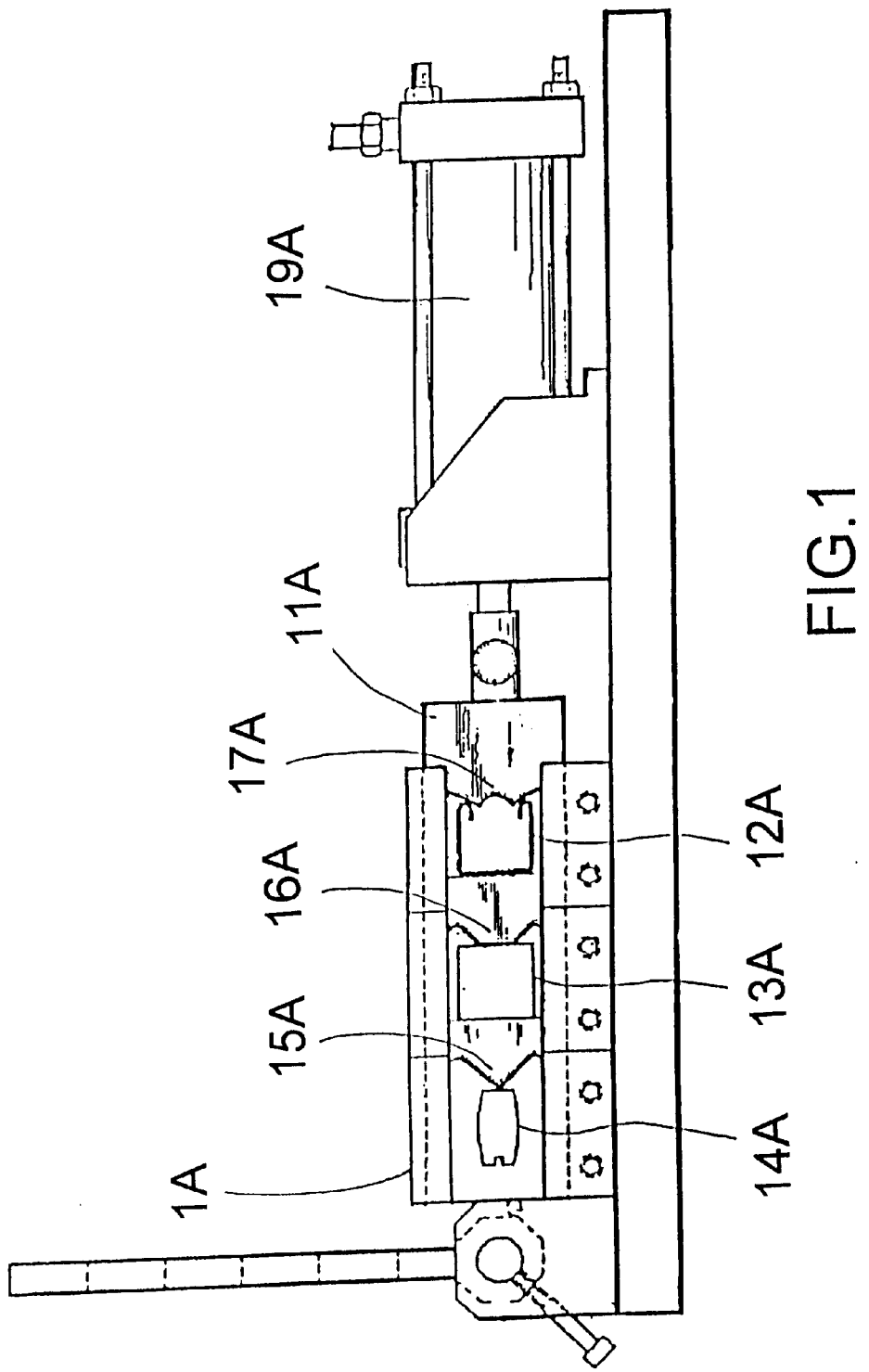
FIG. 1 is an orthographic drawing of the conventional cutting machine.

Referring to FIG. 1 of a cutting machine for a common foamed plastics, a lower rail sliding slot (14A) is mounted relative to the inside of the cutting platform (1). The cutting of the lower rail sliding slot (14A) is done by a spearpoint blade (15A). The lower rail sliding slot (14A), the strip sliding slot (13A) and the upper rail sliding slot (12A) respective provide the sliding for corresponding blind materials. After sliding through, the spearpoint blade (15A), the trapezoidal blade (16A) and hill-shaped blade (17A) mounted on the external side will squeeze and cut by an oil pressure propeller (19A) via the connection of a linking board (11A). Of all the materials mentioned above, the quality of the lower rail of the blind placed in the lower rail sliding slot (14A) is thicker, therefore, the lower rail will be cut by a spearpoint blade (15A) in a way of piercing and squeezing as shown in FIG. 1. Again, since the material body of the lower rail of the blind is thicker, the cut side will appear in irregular shapes after being squeezed and cut. Furthermore, since the cutting method is engaged by an oil pressure propeller (19A), as shown in the FIG. 1 (structural design of U.S. Pat. No. 5,927,172). Professional peripheral equipment is required not only for operating, but also because the quality of the material of the lower rail is similar to that of the plastic steel, so after the thicker foamed plastics are cut, the sharp fuzzy edges of the irregular cut side may injure the user's skin.

Figure 2:
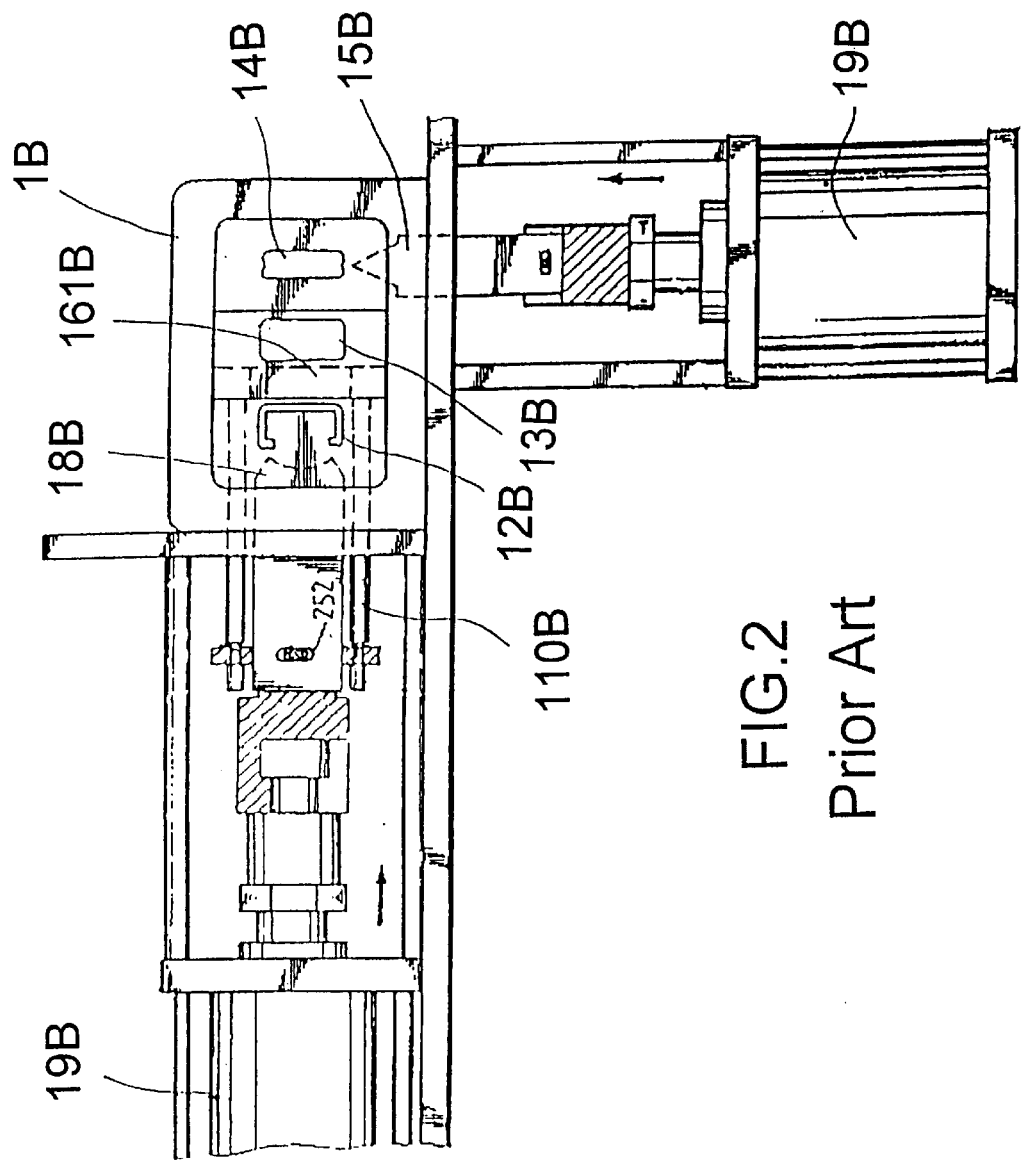
FIG. 2 is an orthographic drawing of the conventional L-shaped cutting machine of dual propelling.
Figure 3:
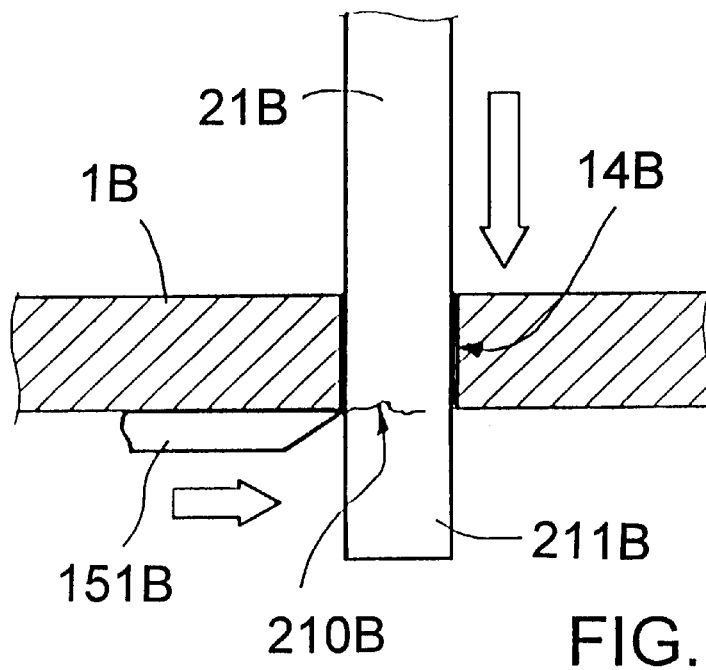
FIG. 3 is the first isometric drawing of the conventional cutting machine conducting a cutting job.
Figure 4:
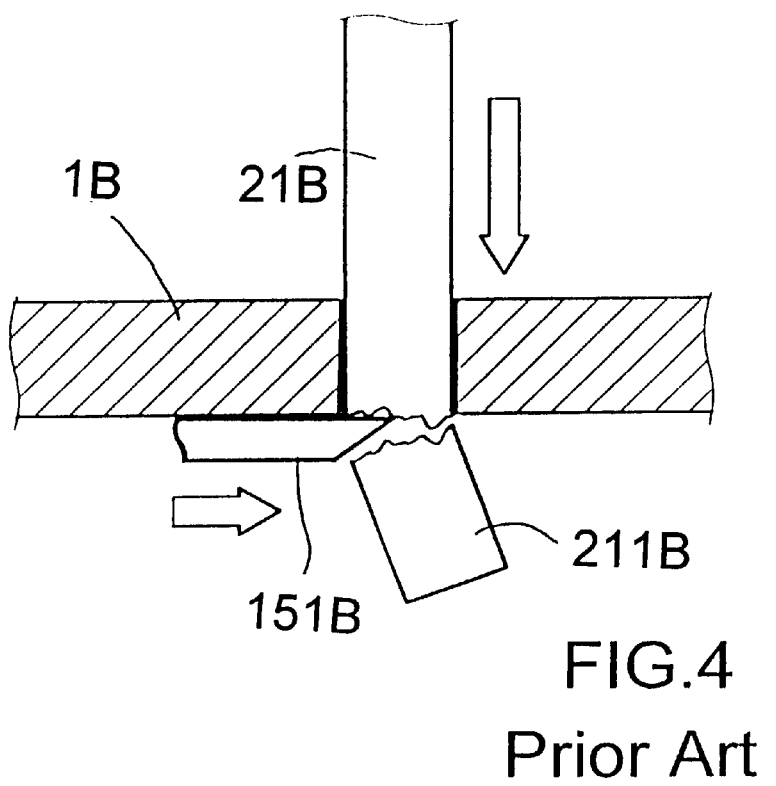
FIG. 4 is the second isometric drawing of the conventional cutting machine conducting a cutting job.

Referring to FIG. 2 of an orthographic drawing of a structure of a cutting machine of U.S. Pat. No. 5,799,557, the structure has a cutting platform (1B) with an upper rail sliding slot (12B), a strip sliding slot (13B) and a lower rail sliding slot (14B) mounted inside and provided respectively with C-shaped blade (18B), flat blade (161B) and spearpoint blade (15B) for respective cutting process. The C-shaped blade (18B) and flat blade (161B) are driven to feed by a transverse propeller (19B) via a linking member (110B). The spearpoint blade (15B) is driven to feed along by a vertical propeller (19B). After being squeezed and cut by the spearpoint blade, the cut side of the foamed plastics or other thicker materials of the lower rail will also be rough and fuzzy, so the end surface of the lower rail will also injure the user's skin or cause other kinds of danger of being cut. Furthermore, the structure revealed is relative complicated and the elements designed for the structure of application are even more complicated, and the structure needs the support of peripheral equipment and tools, such as oil pressure machine and others, to achieve efficient cutting. The cut side of the lower rod (21B) sliding through the lower rail sliding slot (14B) on the cutting platform (1B) cut by the conventional method is shown in FIGS. 3 and 4. Since the body of the lower rod (21B) is thicker, the cutting method of the cutting blade (151B) will be feeding to squeeze and cut to break the cut-off end (211B). However, the shape of the cut side will be irregular as that of the split line (210B) shown in FIG. 3. Furthermore, the fuzzy edges formed by splitting have sharp angular sides and may injure the user's skin. Therefore, in order to efficiently trim the cut side, the invention herein further uses the method of dual blade cutting to do the second time trimming to obtain the even and trimmed effect.

Figure 5:
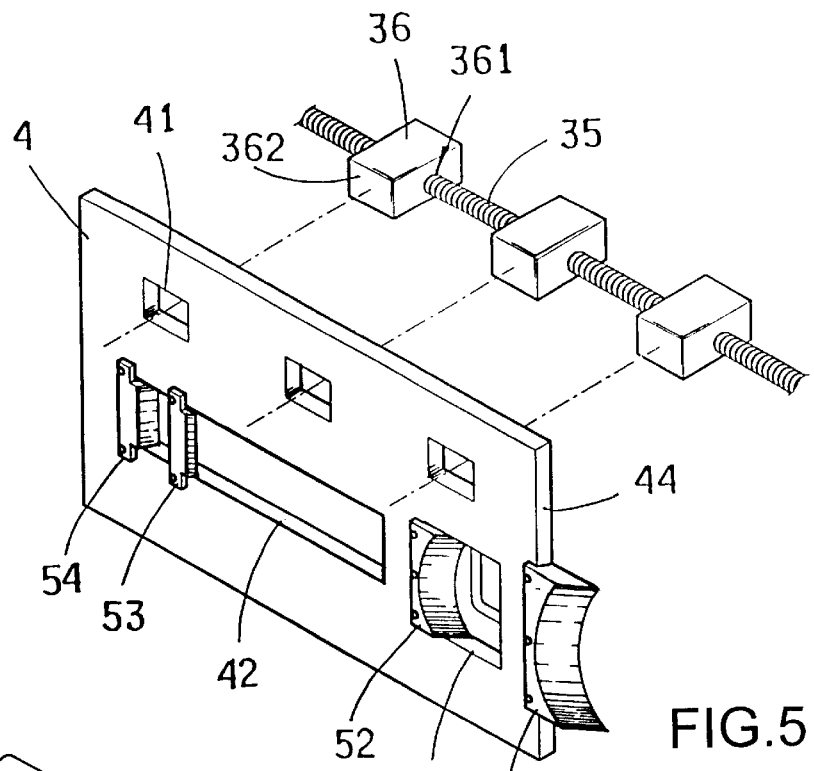
FIG. 5 is an isometric drawing of the partial structure of the invention herein.
Figure 6:
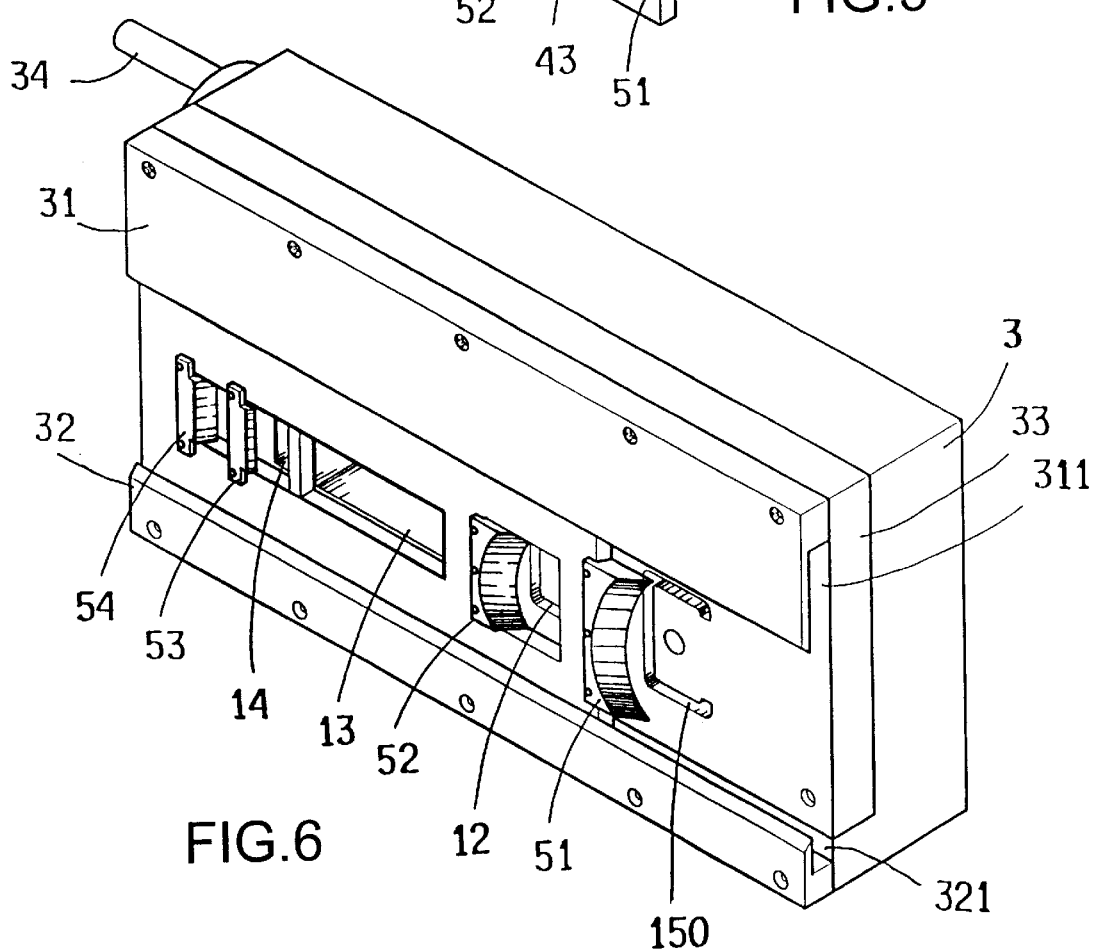
FIG. 6 is an exploded drawing of the outside view of the assembled invention herein.

Referring to FIGS. 5 and 6 of a preferred embodiment of the invention herein, the invention herein is based on a machine platform (3) with a forward filing board (4) moving transversely. A cutting base (33) is mounted on the front side of the machine platform (3). An upper frame board (31) and a lower frame board (32) are disposed outwards on the cutting base (33) to define thereby an upper sliding channel (311) and a lower sliding channel (321) with the filing board (4) placed in between. The filing board (4) has two through holes (42, 43). The cutting base (33) has a lower rail sliding slot (14), a strip sliding slot (13) and an upper sliding slot (12), or even a sliding slot (150) for the window rail of a vertical blind. The through holes (42, 43) on the filing board (4) are mounted relative to every sliding slot (14, 13, 12 and 150). The filing board (4) is mounted with a hill-shaped blade (51), a flat blade (52), a squeezing blade (53) and a trimming blade (54) to work with the squeezing blade (53) for the second time trimming. The receiving holes (41) are opened on an upper side of the filing board (4) to receive a plurality of relative retaining ends (362) of the rotatable retaining blocks (36) inserted on a threaded rod (35). A threaded hole (361) is disposed on each of the retaining blocks (36) to fit relatively to the threaded rod (35). The threaded rod (35) is cranked by a hand-cranking wheel (34). Relative to the squeezing blade (53) and the trimming blade (54), a tool block (6) shifting fore and aft is mounted on the cutting base (33). During the cutting process, the shifting tool block (6) can move up and down according to the movement of the squeezing blade (53) and the trimming blade (54).

Figure 7:
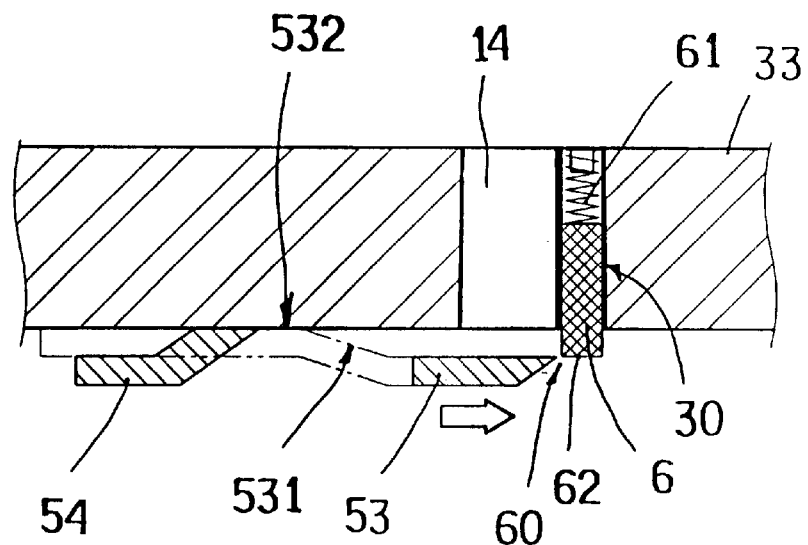
FIG. 7 is the first isometric drawing of the positioning alignment of the dual blade feeding of the invention herein.
Figure 8:
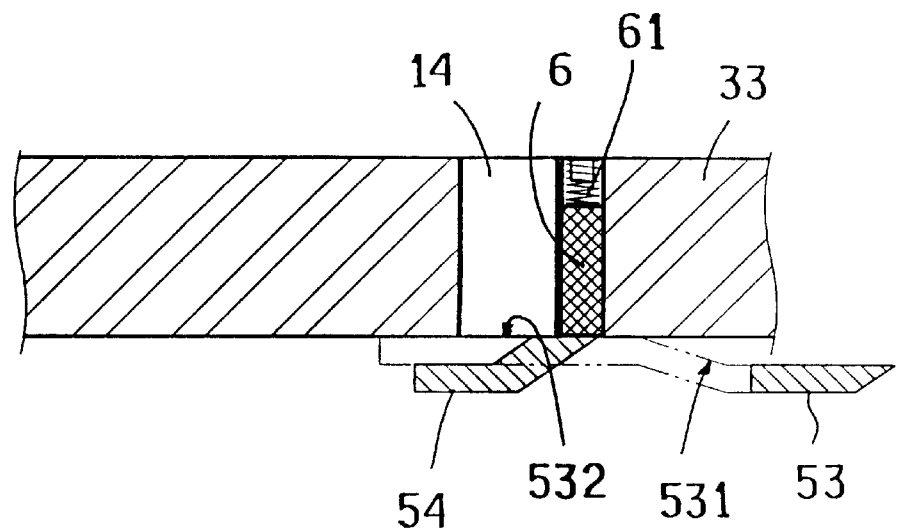
FIG. 8 is the second isometric drawing of the positioning alignment of the dual blade feeding of the invention herein.
Figure 10:
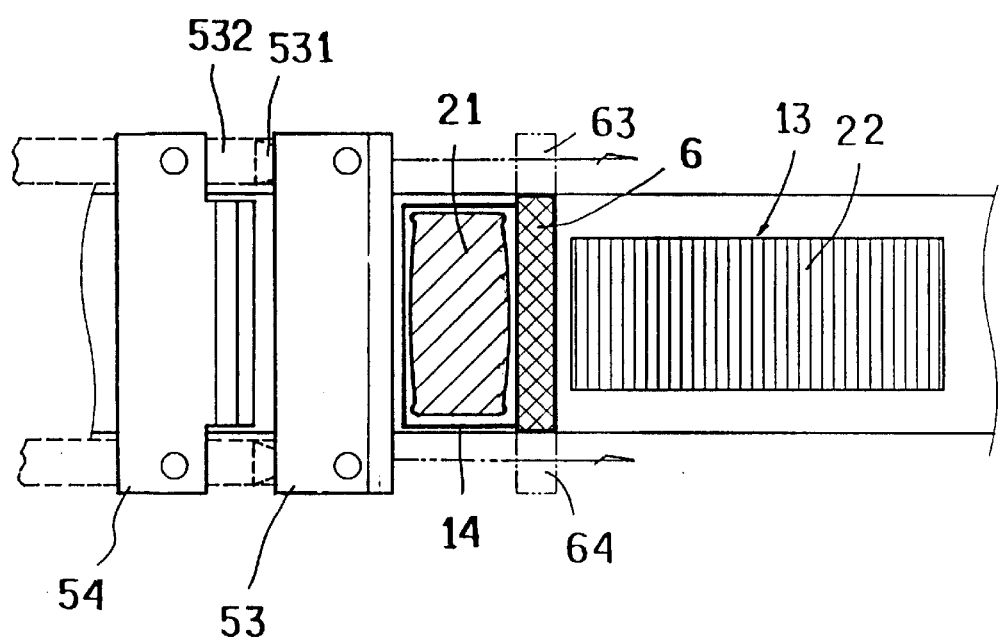
FIG. 10 is the orthographic drawing of the cutting movement of the dual blade feeding of the invention herein.

Referring to FIGS. 7 and 8 of the operating method of the squeezing blade (53) and the trimming blade (54), a sliding slot (30) is mounted relative to one of the end of the lower sliding slot (14) on the cutting base (33). A shifting tool block (6) is mounted inside the sliding slot (30). The shifting tool block (6) is supported from behind by the tension spring (61). An inclined pressing side (531) and a pressing against side (532) sinking downwards and capable of pressing against the tool block (6) extend backwards from the position of the squeezing blade (53) relative to the trimming blade (54). Referring to FIG. 10 of the function of pressing against of the inclined pressing side (531) and the pressing against side (532), during feeding process, shoulders (63, 64) disposed on an upper end and a lower end of the tool block (6) will engage the touching, squeezing and cutting movement to link the body of the tool block (6) and sink toward the inside of the cutting base (33). Therefore, when the cutting blade (53) is doing the first feeding to make the first cut, the tool block (6) is in the status of floating up with the cutting angle (60) corresponding straightly to the blade edge of the first squeezing blade (53). When the squeezing blade (53) cuts pass the position of the tool block (6), by using the linking function of the inclined pressing side (531) and the pressing against side (532), it can cut and press the upper and the lower shoulders (63, 64) of the tool block (60) to make the body of the tool block (6) sink downwards (as shown in FIG. 8). The sinking position of the cutting angle (60) just provides the trimming blade (54) of the second feeding to work a blade edge onto the cutting surface (62) of the tool block (6). When withdrawing the blades, all the movements mentioned above work reversely and make the tool block (6) float up again through the tension spring (61).

Figure 9:
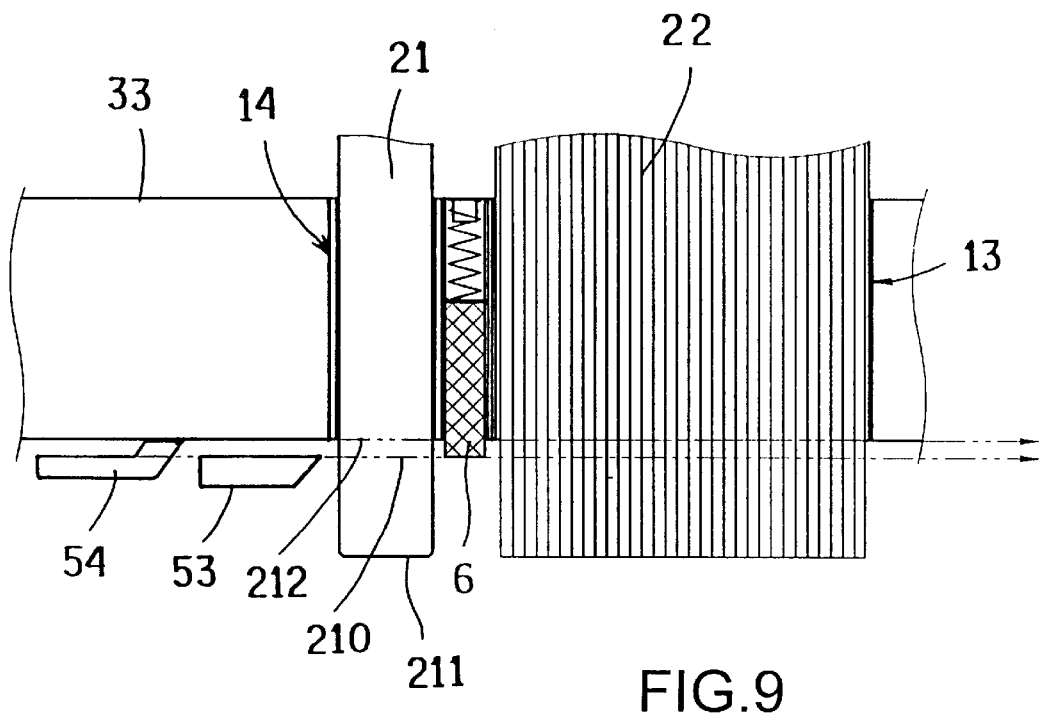
FIG. 9 is a drawing of the bird's-eye view of the cutting job of the dual blade feeding of the invention herein.

Referring to FIGS. 9 and 10 showing the isometric drawing of the application of the cutting base (33) after the sliding of every materials, wherein FIG. 9 is the drawing of the bird's-eye view of the lower rod (21) and the strips (22) sliding through the cutting base (33) and FIG. 10 is the drawing of the orthographic view of every materials sliding into the cutting base (33) for cutting process. The lower rod (21) slides through its sliding slot (14), the strips (22) slide through sliding slot (13), the squeezing blade (53) and the trimming blade (54) using the same method as shown in FIGS. 7 and 8 feed alternatively and correspondingly toward the tool block (6) to make the squeeze blade (53) to feed from the split line (210) at the first squeezing. After feeding, through the inclined pressing side (531) and the pressing against side (532) set by the squeezing blade (53), the tool block (6) can be depressed downwards to allow the trimming blade (54) to do the trimming movement along the trimming line (212). Furthermore, since the distance, about 2 mm to 3 mm, between the squeezing line (210) and the trimming line (212) defines the distance of the fuzzy edge to be trimmed, therefore, after the squeezing blade (53) squeezes off the cut-off end (211), then the trimming blade (54) can trim the thin fuzzy edge to make the cut end of the trimmed materials achieve the effect of being very even. Therefore the feeding method of dual blades can efficiently trim the cut end surface of the said materials to avoid irregular shape and increase the effect of having a good appearance. Furthermore, through the method of hand-cranking rod, the propelling force can be augmented to achieve the objective of easy application.

Another objective of the invention herein is to directly feed the blade to the positions of the strips (22) and cut the strips (22), after the cutting process of the lower rail done by the squeezing blade (53) and the trimming blade (54), by the same method for the upper and the lower layers in unequal orders. The length of the pressing against side (532) must fit the distance of the feeding process of the trimming blade (54) and must extend relative for being able to depress the tool block (6) and cut smoothly toward the right most end of the strips (22) or by any method to make the trimming blade (54) in the process of resuming the home position to sink the tool block (6) and yield to allow the trimming blade (54) to resume. However, by directly feeding the blade, since the strips are thin, so at the right most end on the split line (210) or the trimming line (212), the application of the tool block (6) can be skipped for a one-time synchronous cutting movement or for providing more functional application, such as cutting g thicker strips. As shown in FIG. 11, another tool block (6') is added to the right end of the sliding slot (13) of the strips. The added tool block (6') is also shiftable and has the same function of the previous tool block (6) of enabling the cutting angle (60) facing the blade edge of the squeezing blade (53) and the trimming blade (54) at different heights. The length of the said pressing against side (532) must extends to the length at which the said trimming blade (54) can work onto the second tool block (6').

The further objective of the invention herein is to have a combination of the blades (referring to FIG. 5) capable of being attached and locked on the front side of the filing board (4) directly from the outside to the inside to fixedly lock the hill-shaped blade (51), the flat blade (52), the squeezing blade (53) and the trimming blade (54) of the second feeding (referring to FIG. 6). Since all the blade tools are fixedly locked on the front side, the operation of replacing can be handled at the center on the front side to easily achieve the replacing and protecting of the said blade tools.

Referring to FIG. 12, the sliding slot provided for the lower rod (21) and the strips (22) to slide through can be mounted as a mono slot (130) permitting the lower rod (21) and the strips (22) to be placed in together. Furthermore, a mono shifting tool block (6) can be mounted at the end on the right side for one-time cutting. Again, the length of the pressing against side (532) must be long enough for the whole feeding process to press against the position of the tool block (6).

Another objective of the invention herein is to have several retaining blocks (36) to indirectly retain and link the filing board (4) and the driving threaded rod (35). Through the indirect movement of the threaded rod (35), the filing board (4) can achieve the feeding function of shifting right and left. Furthermore, the filing board (4) has openings of receiving holes (41) and is regulated by the upper frame board (31) and the lower frame board (31) to be able to efficiently slide between the upper sliding channel (311) and the lower sliding channel (321). Therefore, the filing board (4) can be placed directly across behind the top side of the machine platform (3) on the assembled machine platform (30), then the upper frame board (31) and the lower frame board (32) can be locked to achieve the effect of assembly. Therefore, in terms of protection, assembling and manufacturing, the structure does achieve the effect of being relative convenience.

Another objective of the invention herein is to mount a hill-shaped blade (51) at the right end of the filing board (4) (referring to FIG. 6) according to the sliding slot (150) for cutting the window rail of the vertical blind to allow the left position inside the feeding space on the right side of the machine platform (3) to be added by a sliding slot (150) of the vertical window rail to achieve another operating function of the invention herein.

Another objective of the invention herein is to substitute the hand-cranking wheel (34) by other mechanism to drive the threaded rod (35) and with the threading function of the threaded rod (35) to augment the linking force toward the retaining blocks (36) to achieve the objective of electrically controlling the operation.

In summation of the foregoing section, the invention herein fully complies with the new patent application requirements and is hereby submitted to the patent bureau for review and the granting of the commensurate patent rights.

What is claimed is:

1. A dual blade cutting machine for blinds comprising:
   a) a machine platform having a cutting base, a lower rail sliding slot and a strip sliding slot;
   b) a filing board slidably connected to the machine platform, the filing board having a plurality of through holes including first and second spaced apart through holes;
   c) a squeezing blade and a trimming blade mounted on the filing board and extending across the first through hole such that the squeezing blade and the trimming blade are spaced apart from each other;
   d) a curved blade mounted on the filing board and extending across the second through hole; and
   e) a moving device that slides the filing board between an engaged position and a disengaged position relative to the machine platform, wherein the squeezing and trimming blades synchronously move across the lower rail sliding slot and the strip sliding slot in the machine platform as the filing board moves from the disengaged position to the engaged position, such that the trimming blade performs a second cut following an initial cut by the squeezing blade.

2. The dual blade cutting machine for blinds according to claim 1, wherein the moving device includes a threaded rod and a crank.

3. The dual blade cutting machine for blinds according to claim 1, wherein the filing board is slidably connected to the machine platform by an upper sliding channel and a lower sliding channel.

4. The dual blade cutting machine for blinds according to claim 1, further comprising a second curved blade mounted on the filling board and having a curved cutting edge.

5. The dual blade cutting machine for blinds according to claim 1, wherein the strip sliding slot includes a tool block.

* * * * *